United States Patent [19]
Brazzell

[11] 3,752,121
[45] Aug. 14, 1973

[54] ANIMAL COMMODE
[76] Inventor: Jack W. Brazzell, 3416 Brigham St., Toledo, Ohio 43608
[22] Filed: Nov. 12, 1971
[21] Appl. No.: 198,349

[52] U.S. Cl. .................................................. 119/1
[51] Int. Cl. ............................................. A01k 29/00
[58] Field of Search ......................... 119/1; 128/287

[56] References Cited
UNITED STATES PATENTS
3,339,527   9/1967   Burroughs ......................... 119/1
3,358,647  12/1967   Wilson .............................. 119/1
3,344,789  10/1967   Arnold et al. .................. 128/287

Primary Examiner—Hugh R. Chamblee
Attorney—Hugh Adam Kirk

[57] ABSTRACT

A reinforced bottom grooved plastic tray in which is placed disposable pads, each pad comprising a top layer of artificial grass impregnated with an animal attractant, which is adhered to a perforated plastic sheet beneath which is an abosrbant layer backed by an impervious sheet. A container of deodorizer and a plurality of disposable pads may be packaged with each tray.

15 Claims, 4 Drawing Figures

INVENTOR.
JACK W. BRAZZELL
BY
ATTORNEY

ANIMAL COMMODE

BACKGROUND OF THE INVENTION

Previously, trays with disposable pads have been employed for pets and particularly for dogs. However, since many pets are owned by people who are urban and apartment dwellers, and since recent anti-pollution laws forbid the use of public property, such as streets and parks, by these pets, it now has become more important to provide an attractive looking and non-smelling commode for pets. Preferably such a commode should also simulate the outdoors or a lawn which the pet previously has been used to using.

SUMMARY OF THE INVENTION

Generally speaking, the animal commode of this invention comprises an impervious tray and an absorbant mat covered with an artificial grass impregnated with an attractant for the animal.

The impervious tray may comprise a vacuum molded plastic, preferably of a light and sanitary looking color such as white, which contains inwardly sloping edges and grooves in its bottom for both reinforcing the bottom and collecting liquids. If desired, the tray may further be reinforced by being adhered to a stiff backing panel, such as of fiberboard.

The disposable absorbant mat which comprises one of the primary features of this invention may be pre-cut to fit inside of the tray. This mat has for its upper surface an aritifical grass which may be made of raffia or a shredded paper or plastic which may be flocked or woven onto a perforated or pervious sheet. Beneath this sheet is provided a liquid absorbing pad, such as a plurality of sheets of absorbant paper. The back or bottom of this pad is preferably provided with an impervious sheet, such as of plastic, which sheet may have edges and/or comprise the tray itself.

With the package of this animal commode, and a plurality of pads simulating grass, may be included an instruction pamphlet on how to train a pet to use the commode, as well as a small bottle of deodorant, one drop of which may be placed on the pad to mask unpleasant odors, so that each pad may be used several times before having to be disposed of. For a male dog which lifts its leg, there may be placed on the pad an artificial post or plastic fire plug.

Accordingly it is an object of this invention to provide a disposable, attractive, and grass simulating pet commode particularly adaptable for use by dogs where owners live in apartment houses or urban areas that have anti-pollution laws, and/or whose owners do not like to walk their dogs, particularly in bad weather.

DETAILED DESCRIPTION OF THE VIEWS

The above mentioned and other features, objects and advantages and a manner of attaining them are described more specifically below by reference to an embodiment of this invention shown in the accompanying drawings, wherein.

DETAILED DESCRIPTION OF THE PREFERRED EMBODIMENT

Figure 1:
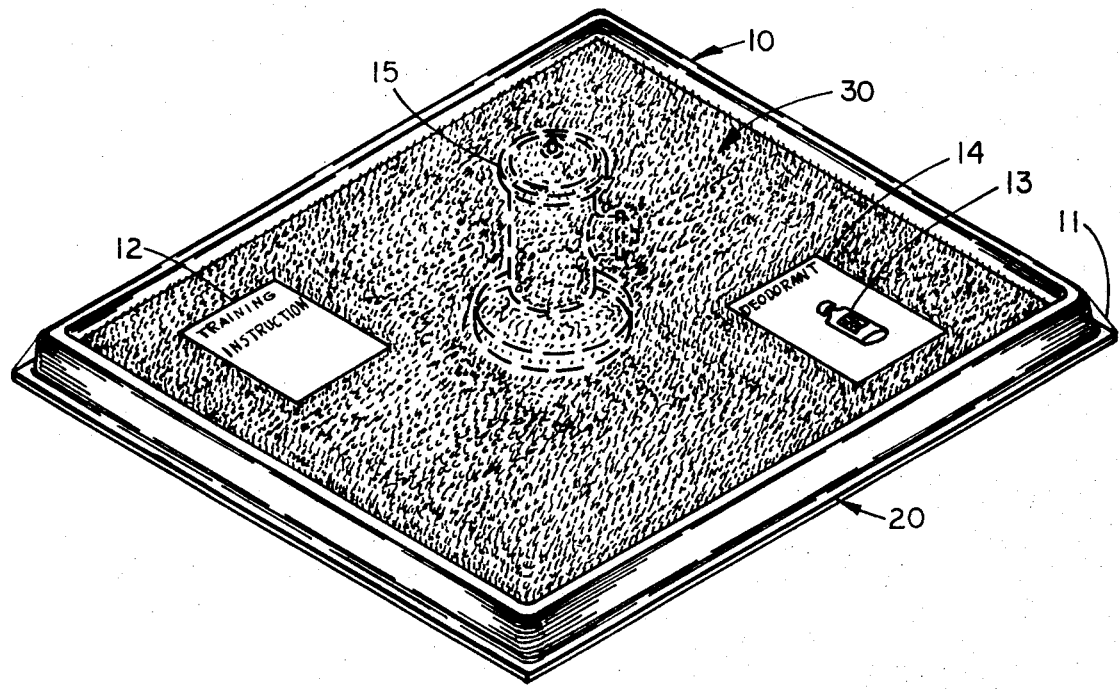
FIG. 1 is a perspective view of an animal commode package according to a preferred embodiment of this invention, showing in dotted lines an artificial fire hydrant which may be used for male dogs in combination with the commode.

Referring primarily to FIG. 1 the packaged animal commode 10, particularly for dogs, may comprise a surrounding transparent plastic film 11 which holds in a plastic tray 20, a plurality of artificial grass disposable mats 30, an instruction book 12, and a small bottle of a non-toxic deodorizer 13 that may be mounted on an instruction card 14. Separate from the commode package 10 there may be provided for male dogs, a small artificial or plastic fire hydrant 15, shown in dotted lines in FIG. 1, that may be placed on the mat 30 in the tray 20. If desired, this artificial hydrant 15 may be used as a receptacle for the deodorant spray, and/or other pet accessories.

Figure 2:
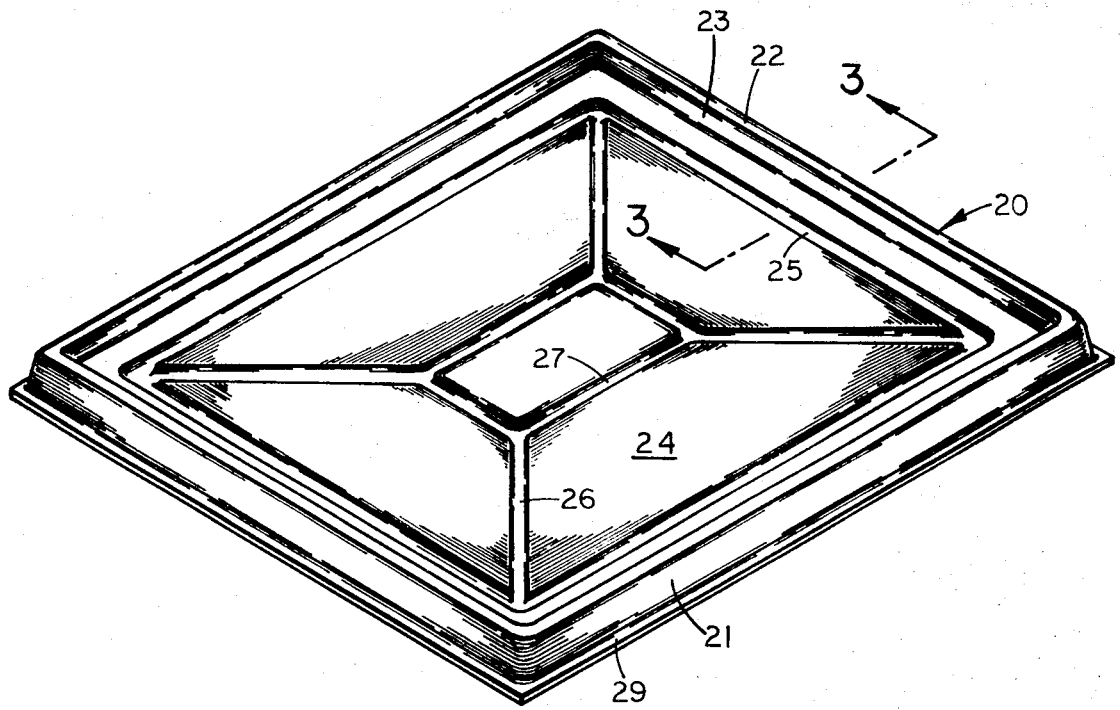
FIG. 2 is a perspective view similar to FIG. 1 showing the tray thereof in which the disposable mats of the present invention are placed.
Figure 3:
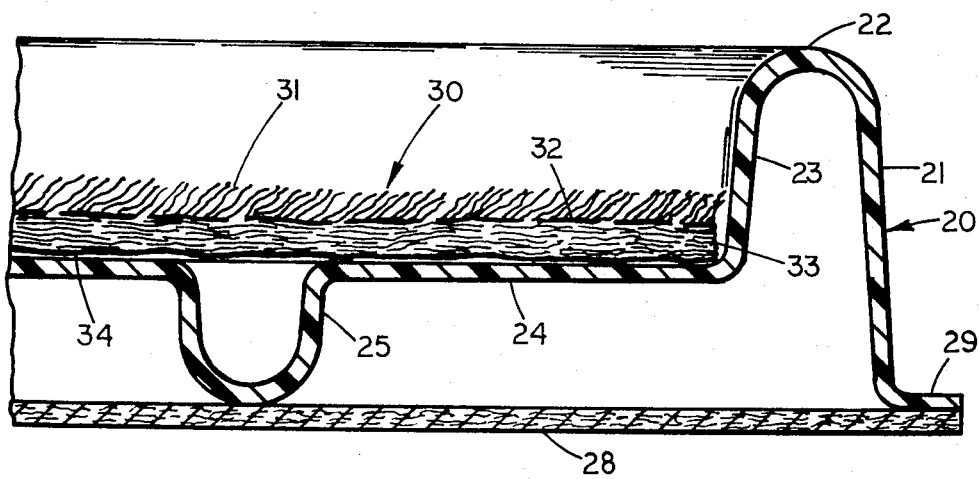
FIG. 3 is an enlarged sectional view taken along line 3 — 3 of FIG. 2 including one disposable mat located in the tray.

Referring next to FIGS. 2 and 3, and tray 20 may be vacuum molded from a plastic sheet to have a peripheral outer wall 21 which has an upper edge 22 and an inner wall 23 of less height than the outer wall 21 so as to support the bottom 24 of the tray above the bottom edge 29 of the outer wall 21 and provide connecting draining and reinforcing grooves 25, 26 and 27 in the bottom 24. The groove 25 may extend around the inside of the inner wall 23 and be connected at intervals, such as at its corners, to grooves 26 that extend radially inwardly to a smaller central concentric groove 27. Although the tray 20 shown herein has a rectangular configuration, it may be of any shape such as triangular for fitting into a corner of a room, polyagonal, circular, irregular, or the like, without departing from the scope of this invention.

If the plastic of the tray 20 is not sufficiently rigid it may be stiffened by being adhesively applied to a stiff backing sheet of fiberboard 28, which contacts the bottom flange edge 29 of the outer wall 21 and the bottoms of the grooves 25, 26 and 27.

Figure 4:
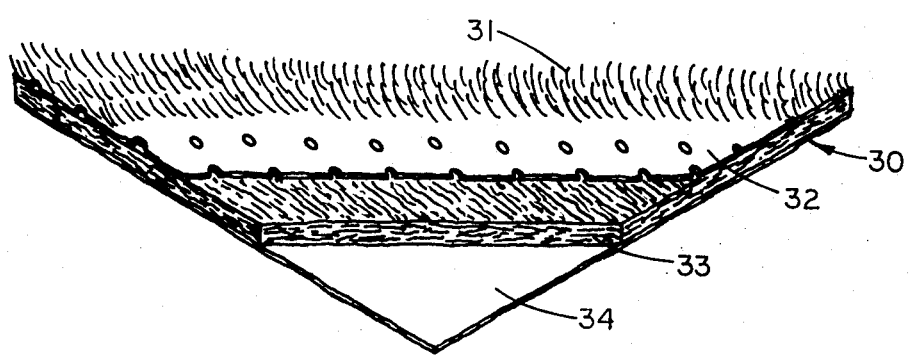
FIG. 4 is an enlarged view of one corner of the disposable mat shown in FIGS. 1 and 3, and separately showing its layers by cutting off larger corners of each layer.

Although the packaged tray 10 as shown in FIG. 1 may contain several disposable mats or pads 30, there is shown in FIGS. 3 and 4 only one of such pads which is normally used within the tray 20. Generally each disposable mat 30 is between about one eighth to one half inches in thickness and about three to four feet square. Each disposable pad is shaped to fit inside the wall 23 of the tray 20 and is primarily composed on its upper surface of a layer of artificial grass 31.

This artificial grass layer 31 may be made of raffia, shredded paper, shredded plastic, or other material of similar texture, or it may be a woven fabric with a nap, such as plastic artificial grass described in Faria et al. U. S. Pat. No. 3,332,828. This artificial grass layer 31 is colored green to represent grass, and may be impregnated with an attractant, such as concentrated urine, for the animal or pet that will entice the pet to use the mat 30 for relieving itself.

If the artificial grass is a shredded material, it may be floculated onto a perforated non-absorbant sheet 32 which may be coated with an adhesive for holding the shredded artificial grass particles 31 in place. This non-absorbant or impervious layer 32 may be an impregnated paper or a plastic sheet, and its perforations permit liquids such as urine deposited upon the artificial grass to drain therethrough and be absorbed in a lower layer or pad 33 therebelow.

Below the artificial grass 31 and its backing sheet 32, there is provided a liquid absorbing pad 33 which may be composed of a plurality of layers of absorbant paper and/or a pad of absorbant fibers to absorb any liquid which seeps through the apertures in the artificial grass backing sheet 32. Preferably, the lowest layer of the mat 20 below the pad 33 is an impervious layer, such as of plastic or an impregnated paper 34, which may be similar to the perforated layer 32.

If desired, any one or all of the layers 32, 33, and 34 may be colored green to match the artificial grass layer 31, snd also may be impregnated with an animal attractant and/or a deodorizer.

After the animal has done its business on the mat, a drop or spray of a deodorizer from the container 13 may be placed on the mat to kill any odor therefrom. However, this deodorizer should not be used so soon that the dog will be repelled thereby, nor should it be used at first in training the pet, because the attractant odor of the grass should be the predominant odor that the pet or animal gets from the disposable mats 30. Feces that are deposited on the mat should be brushed off into a toilet, and then the mat treated or sprayed with a deodorant, if necessary. Thus the mats may be used several times, and even for a period of more than one day, but preferably not longer than a week, before being disposed of by being rolled up, put into a plastic bag, and placed in the garbage can. Since the mats 30 may have plastic ingredients, they should not be flushed down a toilet. In the event a mat with all plastic ingredients therein is used, such may have a longer life than that of one in which only cellulose fibers and/or paper are the primary ingredients.

While there is described above the observed principles of this invention in connection with a specific device, it is to be clearly understood that there may be many unobserved side effects which contribute substantially to the efficiency of this device and that this description is made only by way of example and not as a limitation to the scope of this invention. I claim:

1. An animal commode comprising:
   A. an impervious tray;
   B. a disposable abosrbent mat in said tray,
   C. said mat having an upper pervious layer, and
   D. an artificial grass covering said layer and adhered thereto.
2. A commode according to claim 1 wherein the impervious tray is composed of a vacuum formed plastic material.
3. A commode according to claim 2 wherein the bottom of said tray includes reinforcing ribs.
4. A commode according to claim 2 wherein the reinforced plastic tray comprises a stiff backing sheet to which the tray is adhered.
5. A commode according to claim 1 wherein said abosrbent mat comprises cellulose fibers sandwiched between a pair of sheets , one of which sheets is provided with perforations , and the other of which is impervious .
6. A commode according to claim 5 wherein said artificial grass is adhered to the perforated layer of said absorbant mat.
7. A commode according to claim 1 wherein the artificial grass comprises raffia dyed green.
8. A commode according to claim 1 wherein said artificial grass comprises a green shredded plastic material.
9. A commode comprising:
   A. a tray having a bottom with reinforcing drain grooves therein,
   B. a unitized disposable pad in said tray having an impervious backing layer, an intermediate absorbant layer, and an upper artificial grass layer,
   C. said pad being impregnated with a pet attractant odoriferous composition.
10. A commode according to claim 9 wherein said tray includes a stiff rectangular backing sheet.
11. A pet commode package comprising:
   A. a tray having a bottom with a reinforcing drain groove;
   B. a plurality of unitized disposable pads in said tray, each pad comprising: an impervious backing, an intermediate absorbant layer, and an upper green artificial grass layer impregnated with a pet attractant,
   C. a container of a non-toxic deodorizer,
   D. a training instruction pamphlet, and
   E. a cover for said tray, pads, container, and pamphlet.
12. A package according to claim 11 wherein said cover is a transparent sheet material.
13. A commode according to claim 1 wherein at least one of the elements therein is impregnated with an animal attractant composition.
14. An animal commode comprising:
   A. an impervious tray,
   B. an absorbant mat in said tray having cellulose fibers sandwiched between a pair of impervious sheets, one of which sheets is provided with perforations,
   C. an artificial grass adhered to the perforated layer of said absorbant mat, and
   D. at least one of the above elements is impregnated with an animal attractant composition.
15. A unitary disposable mat adapted to be used as an animal commode, said mat including:
   A. an abosrbent layer,
   B. an upper pervious layer with an artificial grass covering and adhered to the same, and
   C. a bottom layer of impervious material.

* * * * *

PO-1050
(5/69)

UNITED STATES PATENT OFFICE
CERTIFICATE OF CORRECTION

Patent No. 3,752,121             Dated  August 14, 1973

Inventor(s)  Jack W. BRAZZELL

It is certified that error appears in the above-identified patent and that said Letters Patent are hereby corrected as shown below:

Column 1, Abstract, line 5, change "abosrbant" to -- absorbent --. Column 1, line 17, change "absorbant" to -- absorbent --; line 27, change "absorbant" to -- absorbent --; line 34, change "absorbant" to -- absorbent --. Column 2, line 68, change "absorbant" to -- absorbent --. Column 3, line 7, change "absorbant" to -- absorbent --; line 8, change "absorbant" to -- absorbent --; line 16, change "snd" to -- and --; line 47, change "absorbant" to -- absorbent --. Column 4, line 2, change "abosrbent" to -- absorbent --; line 8, change "absorbant" to -- absorbent --; line 18, change "absorbant" to -- absorbent --; line 29, change "absorbant" to -- absorbent --; line 43, change "absorbant" to -- absorbent --; line 49, change "absorbant" to -- absorbent --; line 54, change "abosrbent" to -- absorbent --.

Signed and sealed this 2nd day of April 1974.

(SEAL)
Attest:

EDWARD M. FLETCHER, JR.
Attesting Officer

C. MARSHALL DANN
Commissioner of Patents